(12) United States Patent
Shaffer et al.

(10) Patent No.: US 8,358,599 B2
(45) Date of Patent: Jan. 22, 2013

(54) SYSTEM FOR PROVIDING AUDIO HIGHLIGHTING OF CONFERENCE PARTICIPANT PLAYOUT

(75) Inventors: Shmuel Shaffer, Palo Alto, CA (US); Steven Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 12/435,601

(22) Filed: May 5, 2009

(65) Prior Publication Data

US 2010/0284310 A1 Nov. 11, 2010

(51) Int. Cl.
*H04L 12/18* (2006.01)
*H04L 12/28* (2006.01)

(52) U.S. Cl. ........ 370/260; 370/228; 370/328; 370/356; 370/389; 370/259; 370/401; 709/203; 709/204

(58) Field of Classification Search ............. 370/21–503
See application file for complete search history.

(56) References Cited

U.S. PATENT DOCUMENTS

| | | | | |
|---|---|---|---|---|
| 6,125,115 A * | 9/2000 | Smits | ........................... | 370/389 |
| 6,298,045 B1 * | 10/2001 | Pang et al. | ..................... | 370/261 |
| 6,332,153 B1 * | 12/2001 | Cohen | ........................... | 709/204 |
| 6,404,873 B1 * | 6/2002 | Beyda et al. | ............. | 379/202.01 |
| 6,501,739 B1 * | 12/2002 | Cohen | ........................... | 370/260 |
| 6,731,642 B1 * | 5/2004 | Borella et al. | ................. | 370/401 |
| 6,820,055 B2 * | 11/2004 | Saindon et al. | ............... | 704/235 |
| 6,850,496 B1 * | 2/2005 | Knappe et al. | ................ | 370/260 |
| 6,940,826 B1 * | 9/2005 | Simard et al. | ................. | 370/260 |
| 6,973,184 B1 * | 12/2005 | Shaffer et al. | ............ | 379/420.01 |
| 7,023,867 B1 * | 4/2006 | Park et al. | ...................... | 370/419 |
| 7,035,804 B2 * | 4/2006 | Saindon et al. | ............... | 704/271 |
| 7,133,498 B2 * | 11/2006 | Cacioppo et al. | ............... | 379/45 |
| 7,194,084 B2 * | 3/2007 | Shaffer et al. | ............ | 379/420.01 |
| 7,391,763 B2 * | 6/2008 | Brown et al. | .................. | 370/352 |
| 7,489,679 B2 * | 2/2009 | Brown et al. | .................. | 370/352 |
| 7,567,554 B2 * | 7/2009 | Brown et al. | .................. | 370/352 |
| 7,573,873 B1 * | 8/2009 | Borella et al. | ................. | 370/389 |
| 7,643,436 B2 * | 1/2010 | Provino et al. | ................ | 370/260 |
| 7,742,587 B2 * | 6/2010 | Cohen | ...................... | 379/202.01 |
| 7,764,632 B2 * | 7/2010 | Gray et al. | ..................... | 370/260 |
| 7,996,463 B2 * | 8/2011 | Mousseau et al. | ............ | 709/204 |
| 2002/0044534 A1 * | 4/2002 | Cohen | ........................... | 370/263 |
| 2002/0097708 A1 * | 7/2002 | Deng | ........................... | 370/352 |
| 2003/0058805 A1 * | 3/2003 | Meyerson et al. | .......... | 370/260 |
| 2003/0058806 A1 * | 3/2003 | Meyerson et al. | .......... | 370/260 |
| 2003/0137959 A1 * | 7/2003 | Nebiker et al. | ............... | 370/338 |
| 2004/0068648 A1 * | 4/2004 | Lewis et al. | ................... | 713/153 |
| 2004/0081136 A1 * | 4/2004 | Brown et al. | .................. | 370/352 |
| 2006/0023871 A1 * | 2/2006 | Shaffer et al. | ............ | 379/420.01 |
| 2007/0133436 A1 * | 6/2007 | Provino et al. | ................ | 370/260 |
| 2007/0177529 A1 * | 8/2007 | Provino et al. | ................ | 370/260 |
| 2007/0263603 A1 * | 11/2007 | Schmitt | ......................... | 370/356 |
| 2008/0112336 A1 * | 5/2008 | Gray et al. | ..................... | 370/260 |
| 2010/0284310 A1 * | 11/2010 | Shaffer et al. | ................. | 370/260 |

* cited by examiner

*Primary Examiner* — Ayaz Sheikh
*Assistant Examiner* — Venkatesh Haliyur
(74) *Attorney, Agent, or Firm* — P. Su

(57) ABSTRACT

In one embodiment, a method includes obtaining a first packet associated with a conference that has a first participant associated therewith. The first participant is identified as a principal participant. The method also includes determining if the first packet is associated with the first participant, and providing an audible indication that the first packet is associated with the first participant if it is determined that the first packet is associated with the first participant.

23 Claims, 7 Drawing Sheets

SYSTEM FOR PROVIDING AUDIO HIGHLIGHTING OF CONFERENCE PARTICIPANT PLAYOUT

BACKGROUND OF THE INVENTION

The present invention relates generally to conferencing systems.

Conferences supported by conferencing systems often include multiple participants. Such participants may include persons who are "principals," or persons whose comments during the conferences may be considered to be particularly important. For example, the highest ranking person present on a conference call may be considered to be a principal, or a specialist in a particular area being discussed on a conference call may be considered to be a principal. Typically, comments made by a principal are considered particularly important because of the authority, understanding, and/or content underlying such comments.

When there are many participants in a conference call, it may become difficult to differentiate between different participants or speakers. During a live conference call, a listener may be unable to determine whether a particular voice belongs to a principal participant or someone else, as many voices may sound similar. Likewise, during a playback or review of a recording of the conference, a listener may also be unable to identify who a particular voice belongs to. Hence, it is difficult for a conference call participant, or a party listening to a recording of a conference call, to determine which speakers are particularly important to pay attention to, and which speakers are less important.

BRIEF DESCRIPTION OF THE DRAWINGS

The invention will be readily understood by the following detailed description in conjunction with the accompanying drawings in which.

DESCRIPTION OF EXAMPLE EMBODIMENTS

General Overview

Figure 1:
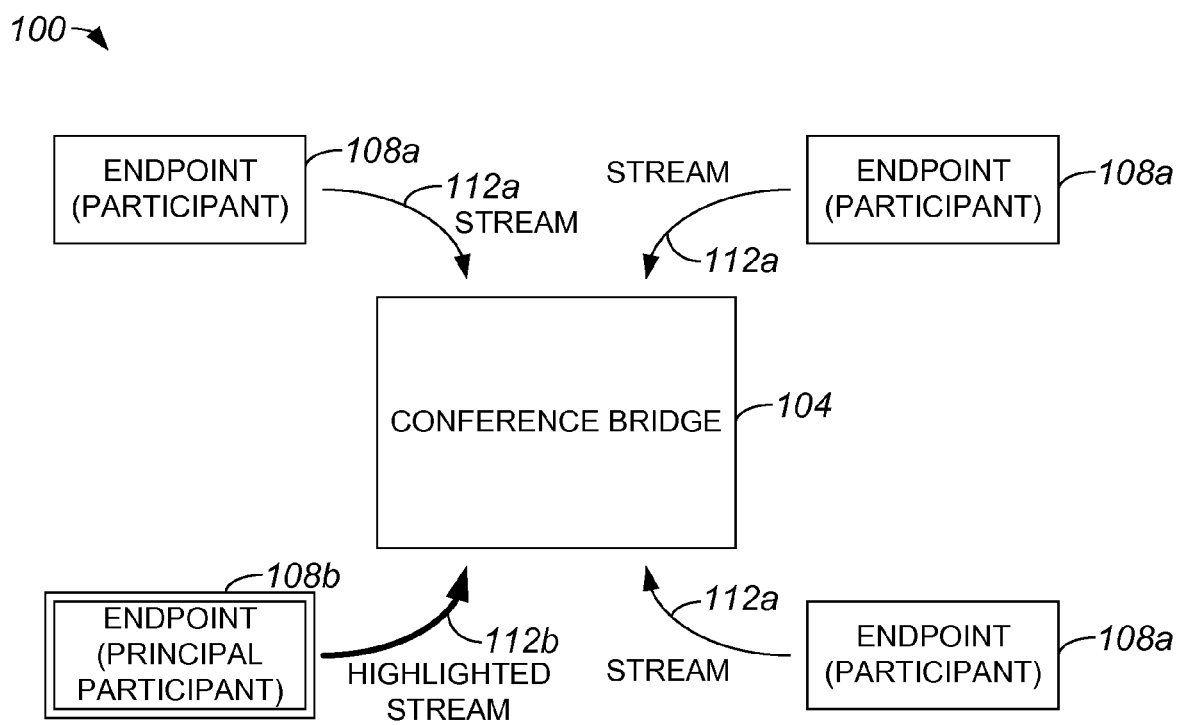
FIG. 1 is a block diagram representation of a conference in which an audio stream associated with a principal participant is highlighted in accordance with an embodiment of the present invention.

According to one aspect of the present invention, a method includes obtaining a first packet associated with a conference that has a first participant associated therewith. The first participant is identified as a principal participant. The method also includes determining if the first packet is associated with the first participant, and providing an audible indication that the first packet is associated with the first participant if it is determined that the first packet is associated with the first participant.

DESCRIPTION

During a live conference, or during a playback of a recorded conference, it may be difficult to identify particular speaker. As some participants in a conference may be principals, or those who have special knowledge or authority, being able to readily identify such participants when they are speaking is desirable. For example, if a listener is able to identify when a principal is speaking, the listener may take care to pay particular attention to the principal, because contributions of the principal may be of added importance and/or may carry more weight than contributions by other participants. A principal may generally make significant contributions to a discussion, so if a listener is able to readily ascertain when a principal is speaking, the listener may actively engage in listening rather than merely engage in monitoring a discussion.

In one embodiment, audible or audio highlighting may be added to a live conference or a playout of a recorded conference such that contributions by principal, or key, participants may be readily identified. Hence, when a listener identifies a contribution that is audibly highlighted, the listener is effectively alerted or notified that a principal is speaking. Audio highlighting may include, but is not limited to including, a tone that sounds just prior to or just after the beginning of a contribution or "talk burst" by a principal, an undertone that persists during the duration of a contribution by a principal, and/or an increased volume during the duration of a contribution by a principal.

Audio highlighting may also take the form of a changed playout speed, as for example when a recorded conference is being played back. Talk bursts from non-principal participants may be played at a faster than normal speeds, and talk bursts from principal participants may be played at normal speeds. Substantially any suitable method may be used to underscore the authority of principal participants.

Each participant in a live conference may select which other participants are considered to be principals. That is, each participant may choose the participants he or she intends to identify as principals. Alternatively, a particular participant in conference may be identified as a principal with respect to the conference, i.e., such that he or she is identified as a principal to all other participants. In other words, a conference system may accommodate the preferences of each participant separately, or may effectively highlight a particular participant substantially identically for all other participants.

Referring initially to FIG. 1, a conference in which a contribution, e.g., a data packet that is a part of an audio stream, associated with a principal participant is highlighted will be described in accordance with an embodiment of the present invention. A conferencing system 100 generally includes endpoints 108a, 108b which participate in a conference via a conference bridge 104. Endpoints 108a, 108b are associated with participants which are, typically, one or more persons participating in a conference. Each endpoint 108a, 108b generally has an address, e.g., an Internet Protocol (IP) address or a port address, that may be used to identify each endpoint 108a, 108b. Endpoints 108a, 108b may include a variety of different devices. Such devices may include, but are not limited to including, computing systems, IP phones, landline phones, and mobile phones. In general, endpoints 108a, 108b may be any devices which are suitable for use in participating in, or listening to, a conference.

Endpoints 108a are associated with non-principal participants. In general, an endpoint 108a may be used by more than one participant. An endpoint 108a may be associated with more than one participant, as for example if endpoint 108a is located in a conference room. Endpoint 108b is associated with a principal, or key, participant. It should be appreciated that endpoint 108b may be associated with non-principal participants, in addition to a principal participant.

Conference bridge 104 is arranged to authenticate endpoints 108a, 108b and to support a conference involving participants 108a, 108b. Conference bridge 104 is further arranged to provide highlighting of audio streams 112a, 112b as appropriate. In the embodiment as shown, because endpoint 108b is associated with a principal participant, audio stream 112b is highlighted such that other endpoints 108a may essentially be alerted that highlighted stream 112b is from a principal participant. As previously mentioned, audio stream 112b may be highlighted by an introductory tone near the beginning of audio stream 112b, an undertone, and/or an increased volume.

An introductory tone may be a brief tone or a "blip" introduction at, or near, the beginning of audio stream 112b. The introductory tone may be added to or inserted before playout of audio stream 112b depending upon the preference of a listener or participant, and the latency of the conference. For example, if an otherwise live conference has a time delay of a few seconds, conference bridge 104 may add an introductory tone prior to playout of audio stream 112b. In one embodiment, conference bridge 104 may effectively compensate for the addition of an inserted introductory tone by speeding up the playout speed near the end of audio stream 112b.

If endpoint 108b is associated with a principal participant as well as a non-principal participant, it should be understood that audio stream 112b may be highlighted when it corresponds to audio provided by the principal participant, and that audio stream 112b may be unhighlighted when it corresponds to audio provided by the non-principal participant. That is, substantially only a talk burst stemming from a principal participant associated with endpoint 108b is highlighted, while talk bursts stemming from non-principal participants associated with endpoint 108b are not highlighted. Speaker recognition systems (not shown) may be implemented by conference bridge 104 to determine when a talk burst originating from endpoint 108b is from a principal participant or from a non-principal participant.

Figure 2:
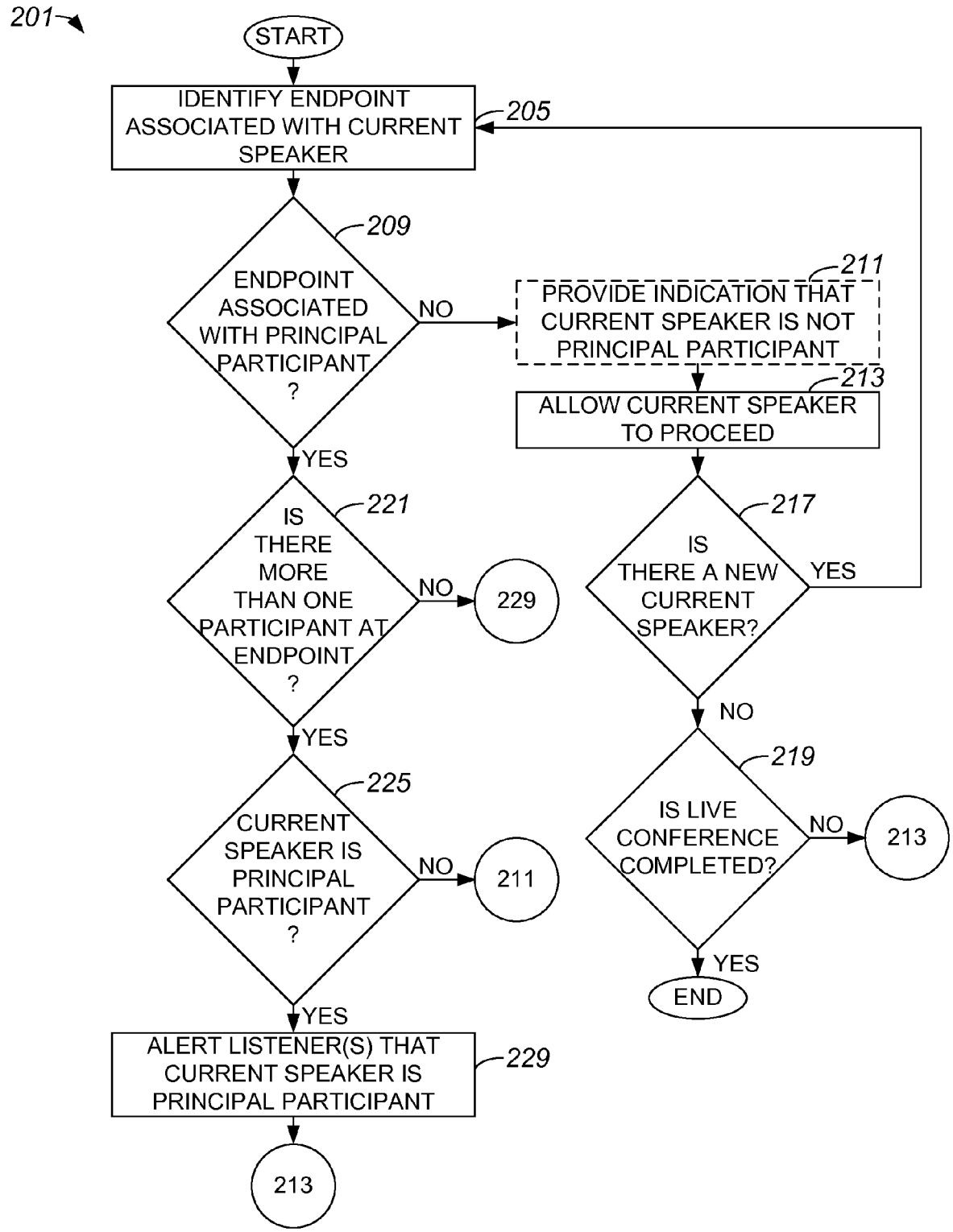
FIG. 2 is a process flow diagram which illustrates a method of implementing audio highlighting during a live conference in accordance with an embodiment of the present invention.

During a live conference, audio highlighting may be implemented such that participants, e.g., non-principal participants, may be alerted to contributions originating from principal participants. FIG. 2 is a process flow diagram which illustrates a method of implementing audio highlighting during a live conference in accordance with an embodiment of the present invention. A process 201 of implementing audio highlighting during a live conference begins at step 205 in which an endpoint associated with a current speaker, i.e., a conference participant who is currently providing audio, is identified. Identifying an endpoint associated with a current speaker may include identifying a port identifier or an IP address for the endpoint. In one embodiment, voice recognition logic may be used by a conference system to identify the current speaker, and a voice signature of the current speaker may be used to identify the endpoint. By way of example, once the current speaker is identified, an IP address associated with the endpoint used by the current speaker may effectively be located.

After the endpoint is identified in step 205, it is determined in step 209 whether the endpoint is associated with a principal participant. In other words, it is determined whether the current speaker is a principal participant in the live conference. The principal participant may be a principal with respect to the overall live conference, or may be a principal participant as designated by a particular participant in the live conference.

If the determination in step 209 is that the endpoint is not associated with a principal participant, the implication is that the current speaker is not a principal participant. Accordingly, process flow moves to an optional step 211 in which an indication that the current speaker is not a principal participant is provided. By way of example, a volume associated with the contribution or talk burst from the current speaker may be lowered to effectively indicate that the current speaker is not a principal participant.

In step 213, the current speaker is allowed to proceed, e.g., to continue speaking. A determination is made in step 217 regarding whether there is a new current speaker. If the determination is that there is a new current speaker, process flow returns to step 205 in which the endpoint associated with the current speaker is identified. Alternatively, if the determination is that there is no new current speaker, a determination is made in step 219 as to whether the live conference is completed. Such a determination may include distinguishing between an extended period of silence during the live conference and a termination of the live conference. If it is determined that the live conference is completed, the process of implementing audio highlighting during a live conference is completed. On the other hand, if it is determined that the live conference is not completed, then process flow returns to step 213 in which the current speaker is allowed to proceed.

Returning to step 209, if it is determined that the endpoint is associated with the principal participant, the indication is that the current speaker may be the principal participant. As such, a determination is made in step 221 as to whether there is more than one participant associated with the endpoint. By way of example, if the endpoint is associated with a phone device in a conference room, there may be multiple participants associated with the endpoint.

If the determination is that there is more than one participant associated with the endpoint, it is then determined in step 225 if the current speaker is a principal participant. Determining whether the current speaker is a principal participant may include utilizing voice or speaker recognition logic to identify the voice signature of the current speaker. The voice signature of the current speaker may be correlated to an individual, and it may be determined if that individual has been designated as a principal participant. If it is determined that the current speaker is not a principal participant, then process flow moves to step 211 in which an indication that the current speaker is not a principal participant is optionally provided.

Alternatively, if it is determined in step 225 that the current speaker is a principal participant, then listeners, e.g., other participants, are alerted that the current speaker is the principal participant in step 229. Listeners may generally be alerted using a variety of different methods. Such methods may include, but are not limited to including, audio methods and visual methods. The current speaker than proceeds to talk or otherwise contribute to the live conference in step 213.

Returning to step 221 and the determination of whether there is more than one participant associated with the endpoint, if it is determine that there is effectively only one participant associated with the endpoint, the indication is that the participant is a principal participant. Accordingly, process flow moves to step 229 in which listeners are alerted that the current speaker is a principal participant.

Figure 3:
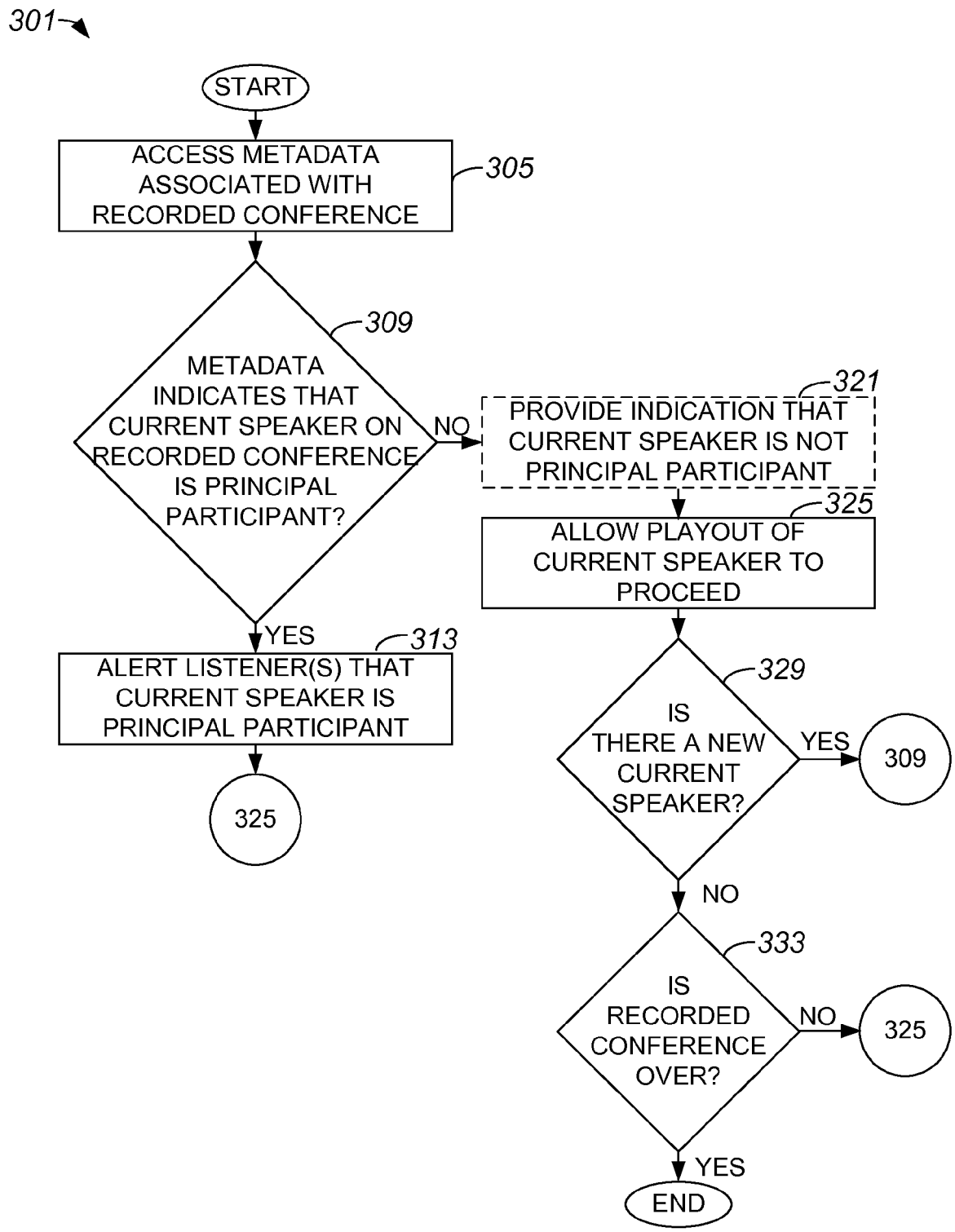
FIG. 3 is a process flow diagram which illustrates a method of implementing audio highlighting during playback of a recorded conference in accordance with an embodiment of the present invention.

Audio highlighting may also be implemented such that individuals who are listening to a recorded conference may be alerted to contributions originating from principal participants. When a recording of a conference is made, metadata may be collected and stored with the recording. The metadata may be arranged to include information that identifies which ports and, hence, which endpoints data came from at any given time during the conference. That is, the metadata may be information about the data provided by endpoints. FIG. 3 is a process flow diagram which illustrates a method of implementing audio highlighting during playback or playout of a recorded conference in accordance with an embodiment of the present invention. A process 301 of implementing audio highlighting during playback begins at step 305 in which a playout system accesses metadata associated with a recorded conference. The playout system may be, in one embodiment, a component of an overall conference system.

Once the metadata associated with a recorded conference is accessed, it is determined in step 309 whether the metadata provides an indication that a current speaker in the recorded conference in a principal participant. The metadata may identify an endpoint associated with the current speaker, and voice recognition methods may be used to identify whether the current speaker is a principal participant. In one embodiment, each listener who listens to the recorded conference may individually select participants who are principals based on his or her preferences. It should be appreciated, however, that a recorded conference may include a common principal participant, or a participant who is identified as a principal to substantially all listeners.

If it is determined in step 309 that the metadata indicates that the current speaker in the recorded conference is not a principal participant, then an indication that the current speaker is not a principal participant is optionally provided in step 321. The indication may be a decrease in volume in the playout associated with the current speaker, or an increased speed for the playout. In step 325, the playout of the current speaker is allowed to proceed.

After the current speaker is allowed to proceed, it is determined in step 329 whether there is a new current speaker on the recorded conference. If it is determined that there is a new current speaker, process flow returns to step 309 in which it is determined if the metadata indicates that the current speaker on the recorded conference is a principal participant.

Alternatively, if it is determined that there is no new current speaker, then a determination is made regarding whether the recorded conference is over in step 333. If the recorded conference is over, the process of implementing audio highlighting during playback is competed. If the recorded conference is not over, process flow returns to step 325 in which the playout of the current speaker proceeds.

Returning to step 309 and the determination of whether metadata indicates that the current speaker on the recorded conference is a principal participant, if it is determined that the current speaker is a principal participant, then listeners are alerted in step 313 that the current speaker is a principal participant. Such an alert may include, but is not limited to including, providing a brief introductory tone at or near the beginning of the playout of the current speaker, providing an undertone, increasing a volume, and/or slowing the speed of playout such that contributions by the current speaker are highlighted or otherwise emphasized. Once listeners are alerted that the current speaker is a principal participant, the playout associated with the current speaker is allowed to proceed in step 325.

Figure 4:
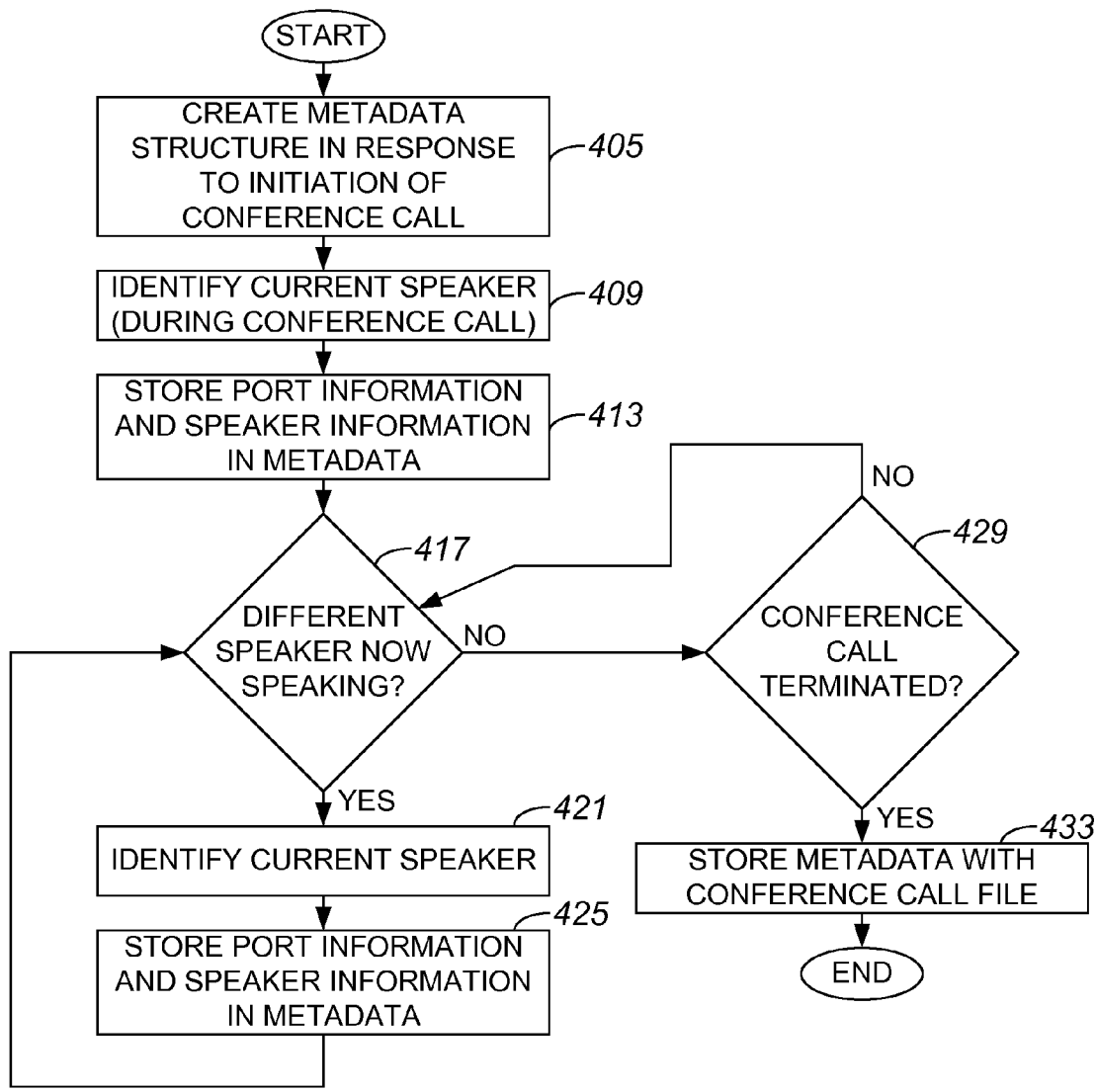
FIG. 4 is a process flow diagram which illustrates a method of recording a conference that may be played back with audio highlighting in accordance with an embodiment of the present invention.

When a live conference is recorded to enable it to be played back at a later time with audio highlighting, metadata is effectively recorded along with the audio streams or, more generally, data associated with the live conference. As previously mentioned, the metadata may provide information regarding where data originated, e.g., an IP address for a port from which an audio stream was provided. FIG. 4 is a process flow diagram which illustrates a method of recording a conference that may be played back with audio highlighting in accordance with an embodiment of the present invention. A process 401 of recording a conference begins at step 405 in which a metadata structure is created in response to the initiation of a conference call. A conference system may be configured to create a metadata structure, e.g., in a file in a memory or as an entry in a database, when a live conference commences and a recording process begins. That is, a conference system effectively creates a metadata structure when there is data for which metadata is available.

After the metadata structure is created, a current speaker is identified in step 409. Identifying the current speaker may include, but is not limited to including, identifying the port from which data associated with the speaker is coming, and applying voice or speech recognition methods. After the current speaker is identified, information relating to the port from which data from the speaker is coming, as well as information relating to the speaker, e.g., information regarding whether the speaker is a principal participant, is stored in or as metadata in step 413.

A determination is made in step 417 regarding whether a different speaker is now speaking or otherwise contributing to the conference. Such a determination may be made, for example, by determining whether data is being provided by a different port and/or by determining whether a different voice is identified. If it is determined that a different speaker is not speaking, then it is determined in step 429 if the conference call has been terminated. If the determination is that the conference call has not been terminated, then the indication is that there has been no change in the speaker. Process flow then returns to step 417 in which it is determined if a different speaker is now speaking. Alternatively, if it is determined in step 429 that the conference call has been terminated, then the metadata is stored with the conference call file, or with information pertaining to the recorded conference call. Once the metadata is stored, the process of recording a conference is completed.

Returning to step 417 and the determination of whether a different speaker is now speaking, if the determination is that a different speaker is now speaking, the new current speaker is identified in step 421. After the new current speaker is identified, information such as a port associated with the new current speaker and information which identifies the new current speaker is stored in metadata in step 425. Information which indicates whether the new current speaker is a principal participant with respect to the overall conference call may also be stored in metadata. Once information is stored in metadata, process flow returns to step 417 in which it is determined whether a different speaker is now speaking.

As mentioned above, a conference call may be such that certain participants are identified as principal participants to all participants. Alternatively, the selection of a particular participant as a principal participant on a conference call may be made on a substantially individual basis by another participant on the conference call. In other words, each participant in a live conference call may select particular participants as principal participants. Further, each listener who elects to listen to a recorded conference call may select particular participants as principal participants.

Figure 5:
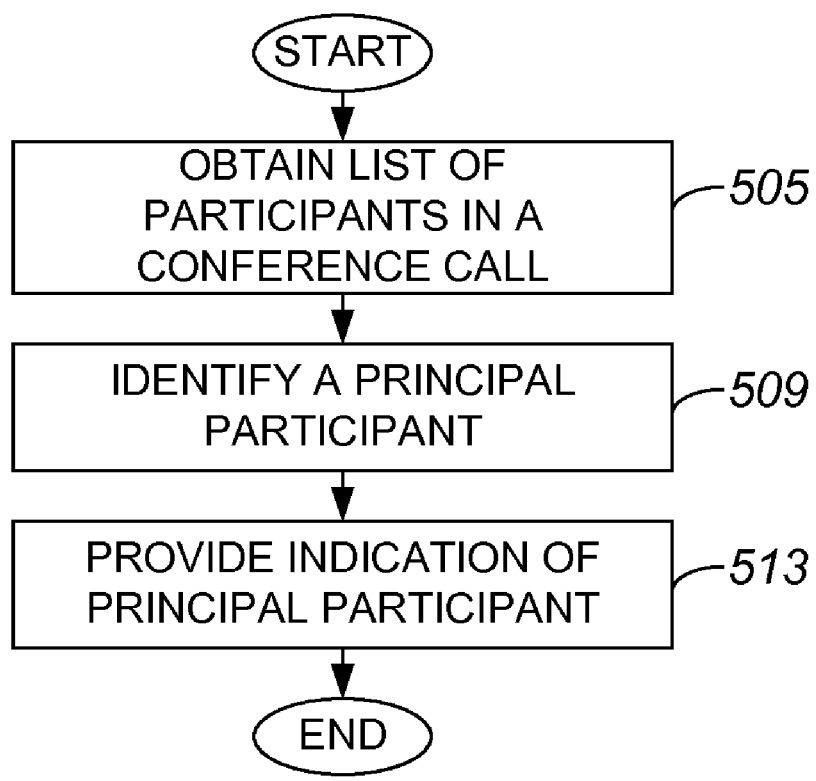
FIG. 5 is a process flow diagram which illustrates a method of selecting a participant to identify as a principal participant in accordance with an embodiment of the present invention.

Referring next to FIG. 5, a method of selecting a participant to identify as a principal participant in accordance with an embodiment of the present invention. It should be appreciated that such a method may be implemented by a conference system or by a user of the conference system, e.g., a participant in a conference hosted by the conference system or a listener to a conference recorded using the conference system. A process 501 of identifying a participant as a principal participant begins at step 505 in which a list of participants in a conference call is obtained. The list of participants may be obtained prior to the beginning of a conference call, in one embodiment, and may be based on, for example, participants expected to participate in the conference call.

Once the list of participants is obtained, a principal participant is identified using the list in step 509. By way of example, a principal participant may be substantially automatically identified by a conference system as the participant with the highest ranking within an organization among all participants. In one embodiment, a principal participant may be identified using input provided by a participant. It should be appreciated that more than one participant may be identified as a principal participant.

After the principal participant is identified, an indication of the principal participant is provided in step 513. Such an indication may include, but is not limited to including, audibly providing a notification that a particular participant has been identified and/or providing a visual notification which indicates that a particular participant has been identified. For instance, the principal participants may be visually highlighted on a display screen which displays identifiers of each participant. In general, providing an indication of a principal participant involves informing participants in a conference call. Upon providing an indication of a principal participant, the process of identifying a participant as a principal participant is completed.

Figure 6:
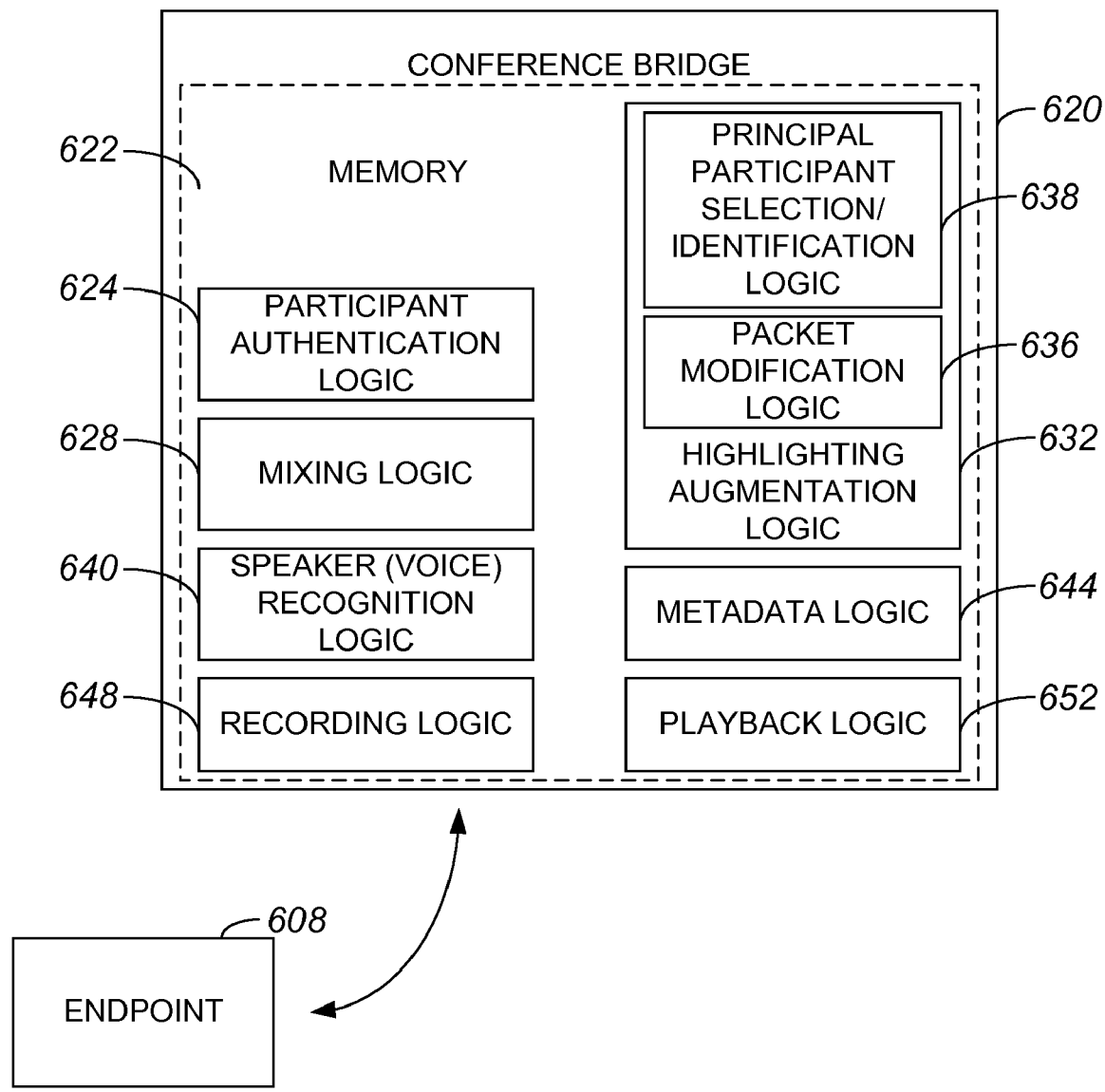
FIG. 6 is a block diagram representation of a conference system that supports audio highlighting in accordance with an embodiment of the present invention.

Functionality which allows for audio highlighting of contributions or talk bursts during a live conference or playback of a recorded conference may be included in a conference bridge, in an endpoint, and/or both. FIG. 6 is a block diagram representation of a conference system that supports audio highlighting through implementing audio highlighting using a conference bridge in accordance with an embodiment of the present invention. A conference system 600 includes a conference bridge 620 and at least one endpoint 608. Conference bridge 620 is arranged to support a conference in which endpoint 608 effectively participates.

Conference bridge 620 includes participant authentication logic 624 that is used to authenticate participants, as for example a participant using endpoint 608, who intend to participate in a conference Mixing logic 628 is generally arranged to perform audio mixing. That is, mixing logic 628 is arranged to mix input signals, e.g., input audio signals from endpoints such as endpoint 608, to produce an output signal. Mixing logic 628 may accommodate preferences of conference participants or listeners to a recorded conference, and may cooperate with highlighting augmentation logic 632 to highlight contributions of conference participants.

Conference bridge 620 also includes speaker or voice recognition logic 640 which may be used to identify participants in a conference call. Typically, speaker recognition logic 640 may be arranged to identify who is speaking rather than what is being spoken, although it should be appreciated that speaker recognition logic 640 may also include speech recognition logic that allows what is being spoken to also be identified.

Highlighting augmentation logic 632, which is also included in conference bridge 620, includes packet modification logic 636 and principal participant selection/identification logic 638. Packet modification logic 636 is arranged to modify data packets, e.g., packets associated with contributions from conference participants, to support audio highlighting. By way of example, packet modification logic 636 may modify packets to provide a brief tone and/or an undertone. Principal participant selection/identification logic 638 allows particular participants associated with endpoints such as endpoint 608 to be identified as principal participants. In one embodiment, principal selection/identification logic 638 includes logic that allows participants in a conference, as well as listeners to recorded conferences, to select principal or key participants.

Conference bridge 620 also includes metadata logic 644, recording logic 648, and playback logic 652. Metadata logic 644 is arranged to collect and to store metadata, e.g., in a memory 622, while recording logic 648 records a conference. Playback logic 652 enables a recorded conference to be played out.

In general, the logic associated with conference bridge 620 may be stored in memory 622. Memory 622 may be accessed, as for example by a processing arrangement (not shown), such that the logic may effectively be executed.

Figure 7:
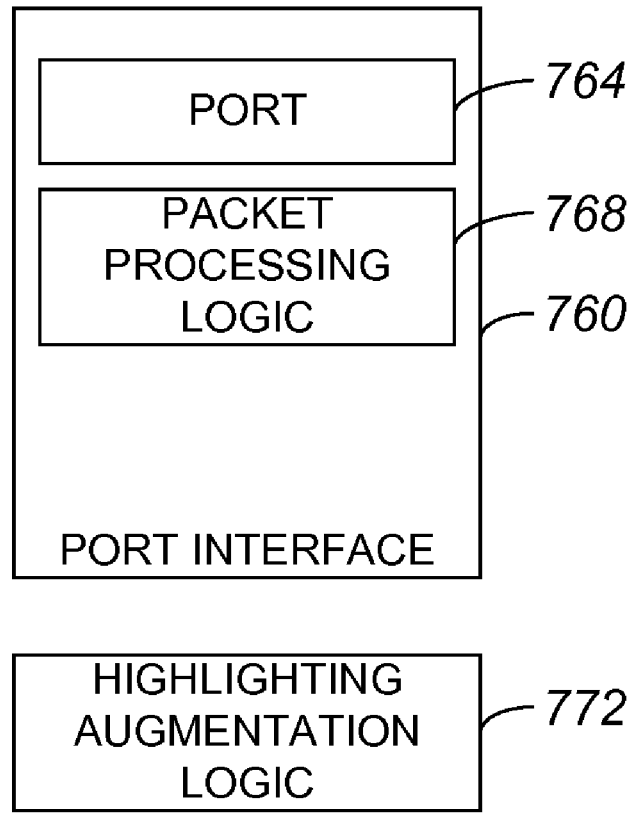
FIG. 7 is a block diagram representation of an endpoint that supports audio highlighting in accordance with an embodiment of the present invention.

With reference to FIG. 7, an endpoint that includes functionality to support audio highlighting will be described in accordance with an embodiment of the present invention. It should be appreciated that if a conference bridge is arranged to provide audio highlighting, the functionality to support audio highlighting in an endpoint may be optional. An endpoint 708, which may be a device such as a telephone or a computer system, includes a port interface 760 and highlighting augmentation logic 772. Port interface 760 includes a port 764 that may be used to communicate with a conference bridge (not shown). Port interface 760 also includes packet processing logic that is arranged to process received packets, in one embodiment. Received packets, e.g., real-time transport control protocol (RTCP) packets or real-time transport protocol (RTP) packets, may be processed to identify information such as a talkerID for RTCP packets and source information data for RTP packets. Such information may be used by highlighting augmentation logic 772 to implement audio highlighting if the information indicates that packets are associated with a principal participant.

Although only a few embodiments of the present invention have been described, it should be understood that the present invention may be embodied in many other specific forms without departing from the spirit or the scope of the present invention. By way of example, audio highlighting functionality may be implemented in substantially any conference system. Such conference systems may include, but are not limited to including, multicast conference systems as well as interoperability and collaboration systems.

A variety of different methods may be used to substantially automatically assign certain conference participants as principal participants. An organizer of conference call may be assigned as a principal. Alternatively, if an email is sent to effectively set up a conference, those identified in a "to" field may be assigned as principals, while those identified in a "cc" field may be assigned as non-principal participants. In one embodiment, higher ranked individuals in a reporting chain within an organization may be assigned as principals, while lower ranked individuals in the reporting chain may be assigned as non-principal participants.

A conference system may provide participants with an option to effectively select a method to use to highlight contributions from principal participants. It should be appreciated, however, than participants may elect not to highlight any contributions. That is, participants may elect not to designate principal participants or not to highlight contributions from principal participants.

Whether a participant in a conference is considered to be a principal or key participant may be based on a variety of different factors. Such factors may include, but are not limited to including, the environments associated with a conference. By way of example, if a conference is an emergency conference on an emergency channel, principal or key participants whose talk bursts may be audibly highlighted may be dispatchers, police captains, fire captains, and/or medical personnel.

If there are multiple principal participants in a conference call, the contributions of all of the principal participants may generally be highlighted, as described above. Each principal participant may be highlighted in substantially the same way, although it should be appreciated that each principal participant may instead be audibly highlighted in a different matter. For example, the audio contributions of each principal participant may be highlighted by a different tone such that other participants or a listener may be able to readily differentiate between the principal participants.

In one embodiment, a single participant in a conference call, or a single party listening to a recording of the conference call, may elect to have more than one principal participant in the conference call highlighted. While each principal participant may be highlighted in substantially the same manner, e.g., with a particular undertone, different principal participants may be highlighted in different manners. For instance, one principal participant may be highlighted by a first undertone and another principal participant may be highlighted by a different undertone such that the two principal participants may be readily distinguished from each other.

When an endpoint is associated with more than one participant, and it is not possible to identify whether a current speaker during a conference is a principal participant, the voice burst or contribution from the current speaker is generally not audibly highlighted as being from a principal participant. Hence, even if the current speaker is actually a principal participant, the voice burst or contribution from the current speaker is not highlighted in some instances unless the current speaker may be reasonably identified as being the principal participant.

To determine whether a talk burst during a conference is associated with a principal participant, a speaker or voice recognition analysis may be performed. When a speaker or voice recognition analysis is performed, a sample against which the talk burst, e.g., a packet associated with the talk burst, is compared to identify the speaker may be obtained at the beginning of the conference when participants audibly identify themselves.

The present invention may be implemented as hardware and/or software logic embodied in a tangible medium that, when executed, is operable to perform the various methods and processes described above. That is, the logic may be embodied as physical arrangements. For example, the logic that enables a computing system to provide audio highlighting may be implemented as arrangements which include hardware logic, software logic, or a combination of both hardware and software logic. The tangible medium may be substantially any computer-readable medium that is capable of storing logic which may be executed, e.g., by a computing system, to perform methods and functions associated with the present invention.

The steps associated with the methods of the present invention may vary widely. Steps may be added, removed, altered, combined, and reordered without departing from the spirit of the scope of the present invention. For example, if an audio highlight is a volume change and/or an undertone, the steps of alerting a participant that a speaker is a principal participant and of allowing the speaker to speak may occur substantially simultaneously. Therefore, the present examples are to be considered as illustrative and not restrictive, and the invention is not to be limited to the details given herein, but may be modified within the scope of the appended claims.

What is claimed is:

1. A method comprising:
obtaining a first packet associated with a conference, the conference having a first participant associated therewith, the first participant being identified as a principal participant;
determining if the first packet is associated with the first participant; and
providing an audible indication that the first packet is associated with the first participant if it is determined that the first packet is associated with the first participant, wherein providing the audible indication includes one selected from the group including providing an introductory tone near a beginning of a playout of the first packet, providing an undertone during the playout of the first packet, increasing a volume during the playout of the first packet, and altering a speed during the playout of the first packet.

2. The method of claim 1 wherein the first participant is associated with a first endpoint, and wherein determining if the first packet is associated with the first participant includes determining if the first packet is obtained from the first endpoint.

3. The method of claim 2 wherein if it is determined that the first packet is obtained from the first endpoint, determining if the first packet is associated with the first participant includes performing voice recognition analysis on the first packet.

4. A method of claim 1 comprising:
obtaining a first packet associated with a conference, the conference having a first participant associated therewith, the first participant being identified as a principal participant wherein obtaining the first packet includes obtaining a recording of the conference and obtaining metadata associated with the recording;
determining if the first packet is associated with the first participant; and
providing an audible indication that the first packet is associated with the first participant if it is determined that the first packet is associated with the first participant.

5. The method of claim 4 wherein determining if the first packet is associated with the first participant includes determining if the metadata indicates that the first packet is associated with the first participant.

6. The method of claim 1 wherein the method further includes:
creating a recording of the conference;
storing the first packet in the recording; and
storing metadata associated with the first packet.

7. The method of claim 6 wherein if it is determined that the first packet is associated with the first participant, the metadata indicates that the first participant is the principal participant.

8. The method of claim 1 further including:
providing an indication that the first participant is the principal participant.

9. A computer-readable logic encoded in one or more non-transitory computer-readable media for execution and when executed operable to:
obtain a first packet associated with a conference, the conference having a first participant associated therewith, the first participant being identified as a principal participant;
determine if the first packet is associated with the first participant; and
provide an audible indication that the first packet is associated with the first participant if it is determined that the first packet is associated with the first participant, wherein the logic operable to provide the audible indication is further operable to provide an introductory tone near a beginning of a playout of the first packet, provide an undertone during the playout of the first packet, increase a volume during the playout of the first packet, and change a speed associated with the playout of the first packet.

10. The computer-readable logic of claim 9 wherein the first participant is associated with a first endpoint, and wherein the logic operable to determine if the first packet is associated with the first participant is further operable to determine if the first packet is obtained from the first endpoint.

11. The computer-readable logic of claim 10 wherein if it is determined that the first packet is obtained from the first endpoint, the logic operable to determine if the first packet is associated with the first participant is further operable to perform voice recognition analysis on the first packet.

12. A computer-readable logic encoded in one or more non-transitory computer-readable media for execution and when executed operable to:
obtain a first packet associated with a conference, the conference having a first participant associated therewith, the first participant being identified as a principal participant, wherein the logic operable to obtain the first packet is further operable to obtain a recording of the conference and to obtain metadata associated with the recording;
determine if the first packet is associated with the first participant; and
provide an audible indication that the first packet is associated with the first participant if it is determined that the first packet is associated with the first participant.

13. The computer-readable logic of claim 12 wherein the logic operable to determine if the first packet is associated with the first participant is operable to determine if the metadata indicates that the first packet is associated with the first participant.

14. The computer-readable logic of claim 9 further operable to:
create a recording of the conference;
store the first packet in the recording; and
store metadata associated with the first packet.

15. The computer-readable logic of claim 14 wherein if it is determined that the first packet is associated with the first participant, the metadata indicates that the first participant is the principal participant.

16. The computer-readable logic of claim 9 further operable to provide an indication that the first participant is the principal participant.

17. An apparatus comprising:
means for obtaining a first packet associated with a conference, the conference having a first participant associated therewith, the first participant being identified as a principal participant;
means for determining if the first packet is associated with the first participant; and
means for providing an audible indication that the first packet is associated with the first participant if it is determined that the first packet is associated with the first participant, wherein the means for providing the audible indication include one selected from the group including means for providing an introductory tone near a beginning of a playout of the first packet, means for providing an undertone during the playout of the first packet, means for increasing a volume during the playout of the first packet, and means for altering a speed during the playout of the first packet.

18. An apparatus comprising:
a first arrangement, the first arrangement including logic encoded in one or more non-transitory computer-readable media and configured to identify whether a packet associated with a conference is further associated with a principal participant in the conference; and
a second arrangement, the second arrangement including the logic encoded in the one or more non-transitory computer-readable media and configured to audibly highlight the packet during playout if it is determined that the packet is associated with the principal participant, wherein the second arrangement is configured to audibly highlight the packet during playout by performing at least one selected from the group including providing an introductory tone near the beginning of the playout, providing an undertone during the playout, changing a volume associated with the playout, and altering a speed of the playout.

19. The apparatus of claim 18 wherein the apparatus is a conference bridge.

20. The apparatus of claim 18 wherein the apparatus is an endpoint arranged to communicate with a conference bridge.

21. The apparatus of claim 18 wherein the second arrangement is configured to audibly highlight the packet by altering the packet.

22. The apparatus of claim 18 further including a third arrangement, the third arrangement including the logic encoded in the one or more non-transitory computer-readable media and configured to store the packet and to store metadata associated with the packet, wherein the metadata indicates whether the packet is associated with the principal participant.

23. The apparatus of claim 18 further including a third arrangement, the third arrangement being configured to allow a first participant to be specified as the principal participant.

* * * * *